Feb. 17, 1953  W. H. ALLISON  2,628,756
ICE-CREAM PACKAGING MACHINE
Filed April 12, 1950

INVENTOR
WALTER H. ALLISON — DECEASED
BY
NAOMI T. BLICK — ADMINISTRATRIX
BY
Munro, Liddy & Slaccum
ATTORNEYS Patented Feb. 17, 1953

2,628,756

UNITED STATES PATENT OFFICE 2,628,756

ICE-CREAM PACKAGING MACHINE

Walter H. Allison, deceased, late of Takoma Park, Md., by Naomi T. Blick, administratrix, Mount Rainier, Md.

Application April 12, 1950, Serial No. 155,544

6 Claims. (Cl. 226—19)

This invention relates to pakaging devices, and more particularly to an electrically controlled machine for packing bulk ice cream into cartons.

An object of the invention is to provide a power driven device principally for use in retail ice cream stores, and which is so constructed as to be of such weight and size to enable it to be used as a hand instrument with which bulk ice cream may be loaded directly from the container into the cardboard carton.

Another object of the present invention is the provision of an ice cream extracting and packing machine having a rotatable carton holder equipped with a plurality of inclined arcuate blades for slicing the bulk product and conveying the same upwardly into the awaiting carton.

A further object of the invention is to present to the retail industry a motor driven packing machine which may be activated at a point remote from the source of driving power by means of a flexible cable, thus averting the presence of undue weight in the machine which would cause fatigue to the user.

Still another advantage in this device lies in the simplicity of construction which makes the present invention easily operated by even unskilled workers, and further, is in complete accord with sanitary requirements.

These and other advantages of the invention will become apparent from the following description and the accompanying drawings, in which.

The present method of packaging bulk ice cream by clerks in retail stores is an antiquated procedure in which there has been little or no successful improvement down through the years. The well known operation of scooping portions of ice cream from the metallic counter containers is both time consuming and unsanitary. During rush periods of the day there invariably results a log jam in customer service since the rapidity with which the clerks can accommodate customers is limited due to the difficult and extensive labor in individually scooping portions of hardened ice cream. Furthermore, it is noted that in especially warm weather it frequently occurs that the arms and hands of a clerk will become unavoidably unsanitary from dirt and perspiration. By using a conventional hand scoop it is next to impossible for the clerk to dispense ice cream without allowing the hand or arm to come in contact with the cream retained on the side walls of the container.

With these disadvantages and difficulties in mind, the present invention has been devised with the intent of providing for the first time, a successful mechanical means for dispensing bulk ice cream which means will not only be economical to manufacture, but also easy for even women clerks to continuously operate throughout a working day and at the same time will retain the characteristic consistency preferred in bulk type ice cream.

Figure 1:
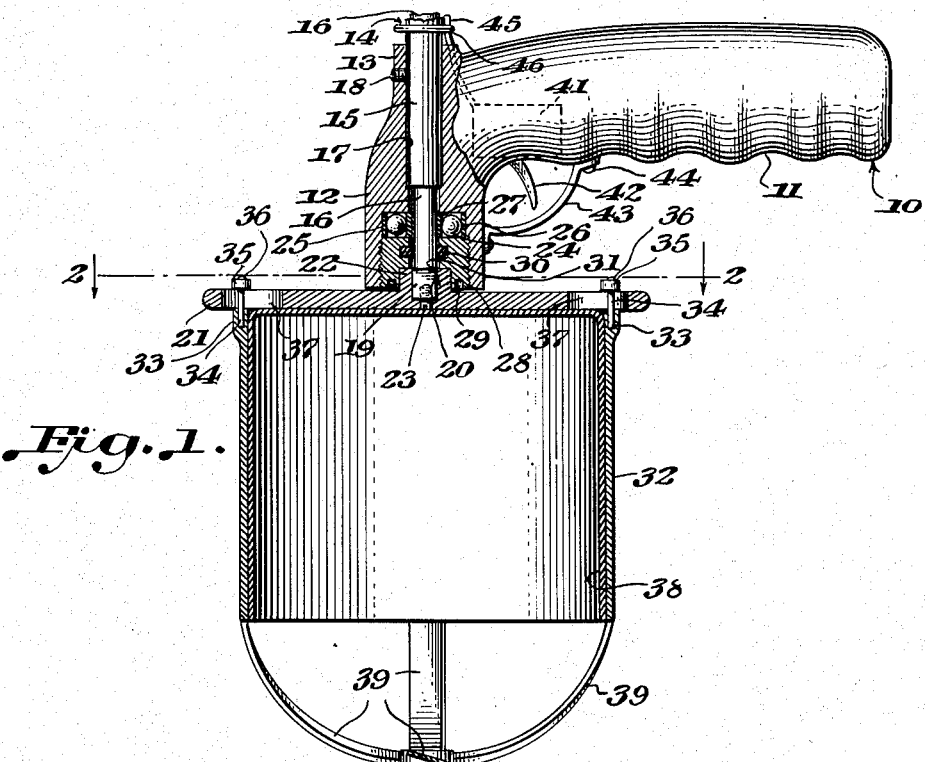
Figure 1 is a side elevation view of the ice cream packing machine shown partly in section to clearly disclose the inner elements of the device.

As will be seen from Fig. 1 of the drawing, the device will be conveniently grasped by means of a handle (generally designated by the numeral 10) formed of plastic or Bakelite, or if desired, some well known light weight metal such as aluminum alloy. The handle 10 is in the form of a pistol grip having a plurality of depressions 11 on its undulated lower surface which will add to the comfort and firmness of the grip by the operator's hand. The forward end of handle 10 has formed thereon a depending hub 12 which houses the working mechanism of the device.

An upstanding boss 13 is formed above the previously mentioned hub 12, this boss being hollow in construction and adapted to receive the free end of a power cable 14. Cable 14 comprises flexible elements consisting of an outer sheath 15 and inter-rotatable core or rod 16. The non-rotating sheath fits within the opening 17 extending vertically through the pistol grip element, and is rigidly secured to the pistol grip by means of a set screw 18 projecting through the cylindrical wall of the aforementioned boss 13.

Figure 2:
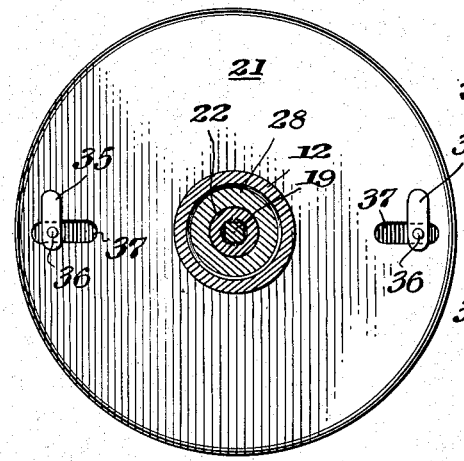
Figure 2 is a sectional view taken on line 2—2 of Fig. 1.
Figure 3:
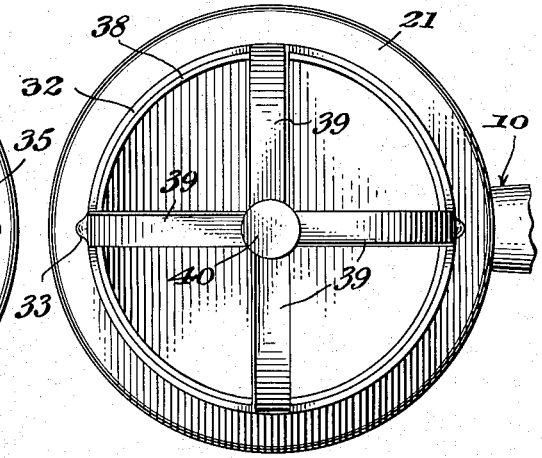
Figure 3 is a bottom view of the device.

The rotatable shaft 16 projects beyond its sheath and extends below the lower end of the grip hub 12. The extreme end portion 19 of the shaft is preferably designed to be square in cross section (Fig. 2) and is adapted to be received in a mating recess 20 formed in the upper surface of a disk or plate 21. As best seen in Fig. 2 of the drawing, this disk is circular in plan and has an upstanding coaxial boss 22 which contains the preveiously mentioned mating recess 20. It will of course be understood that end 19 of the flexible shaft may be formed in any convenient manner, which will prevent relative rotation between the shaft and its associated disk 21. Furthermore, in order to prevent relative axial movement between the shaft and disk, a clamp screw 23 may pass through a drilled aperture at the central axis of disk 21, and may be received in an internally threaded hole in the end surface of shaft 16. This latter securing arrangement is but one of a number of similar methods possible to prevent movement between the drive shaft 16 and the rotatable disk 21.

In order to insure free rotation of the power shaft within pistol grip 10, there has been provided an anti-friction bearing means comprising a plurality of ball bearings 24 resting between laterally spaced and concentric bearing rings or races 25 and 26, respectively. The elements of this ball bearing race are received in a counter-bored recess extending upwardly from the lower surface of hub 12, and are limited as to upward movement by an end wall 27 formed transversely of the hub. The bearing race is retained in place by an externally threaded nut 28, the threads of which cooperate with internal threads formed within the hollow handle hub. Oppositely disposed indentations or drilled holes 29 are provided in the outer face of the retaining nut, and these holes are adapted to receive a spanner wrench or other convenient tool for inserting and removing the threaded nut element.

An important feature in the efficient operation of an anti-friction bearing resides in its constant and proper lubrication. Since unsealed lubricant becomes a problem of sanitation in devices for handling food stuffs, an O type sealing ring 30 is carried in an annular recess formed about the periphery of the opening 31 formed in the retaining nut. The presence of this O ring allows adequate lubrication of the working elements of the anti-friction device without possibility of leakage of lubricant past the lower end of the drive shaft 16 and outwardly upon the surface of the revolving disk.

The revolving power disk or plate 21 carries on its lower surface a cylindrical shell 32 which is preferably manufactured from aluminum or stainless steel. This shell is provided with oppositely disposed protuberances 33 in each of which is seated a vertical pin 34. Each pin 34 has a reduced portion at its upper end upon which is received a lug 35 rotatably secured on the pin by an enlargement 36 formed on the head of the pin after placement of the lug.

The power disk has elongated openings 37 disposed at opposite sides thereof in order that shell 32 may be removably attached to the undersurface of the disk merely by aligning each lug lingitudinally with its respective opening so that the lug may pass through the disk plate and may be rotated at a 90° angle to securely hold the disk and shell together. This affords a quick and convenient method of attaching the above-mentioned elements, and since the lugs 35 are located on the upper surface of the disk during operation of the packing machine, they will not come into contact with the ice cream along the side walls of the metallic container, and this feature adds an additional aspect of sanitation.

As best seen in Fig. 1, a cylindrical cardboard container 38 is slidably received within the hollow sleeve 32. It will be readily understood that the cardboard container is of the conventional type used in retail ice cream sales and may be of any capacity, although sizes ranging from a half pint to one quart are most customarily used. A separate container shell 32 is made available of corresponding size to the particular capacity carton selected to be filled.

The lower rim of the container shell 32 has integrally formed or riveted thereon a plurality of arcuate blades 39. While for the purpose of illustration only four such blades have been shown, it will be understood that as many as eight blades may be incorporated with the effectiveness of operation.

As seen in Fig. 1, each individual blade segment is inclined or twisted downwardly in the direction of rotation of the power disk 21. The blades are inclined in cross section and curved convexly along their length outwardly from the lower end of shell 32. This enables the ice cream to be sliced in layers by each revolving blade and the inclination of the blade will assist in conveying the several sheets of ice cream upwardly into the awaiting carton 38. Although not absolutely necessary, it will be understood that the leading edge of each blade may be provided with a knife-like edge to assist the blade in penetrating hard frozen ice cream. Furthermore, a decided advantage is realized by designing the plurality of cutting blades as a semi-spherical structure in that the packing machine may be more easily depressed into the dense ice cream and has a greater slicing tendency resulting in more rapid and uniform loading of the carton. The blades may consist of individual segments integrally connected by a central hub 40 or may, if desired, comprise semi-circular blades joined at their centers by a rivet or other convenient connecting means, not shown.

As previously explained, the driving motor which provides the source of power for the present invention, may be remotely located from the actual packing device in any convenient place such as the top of the freezer unit, or a nearby shelf or counter. The flexible cable 14 provides a power takeoff means extending from the motor to the packing device, and in order to make the entire arrangement more convenient it has been found necessary to provide an electrical circuit breaking means located directly on the handle of the packing machine. This circuit breaking means consists of any conventional type switch 41 located within the pistol grip portion of the handle, and having depending therefrom a curved trigger piece 42 conveniently located so as to co-operate with the forefinger of the user's hand. A trigger guard 43 is fastened at either side of the trigger by means of screws or rivets 44.

The electrical wire 45 connecting switch 41 with the remote motor preferably projects from the upper surface of the handle at which point it may be clamped securely to the outer surface of sheath 15 by means of a plurality of clamping rings 46. By attaching the wire to the power cable, the inconvenience of a plurality of trailing elements between the motor and the packing machine is obviated. However, it is to be understood that the clamping means above described is but one of a number of possible arrangements and it is not the intention to so limit the invention by the method shown in Fig. 1.

In the operation of the invention the clerk selects a carton of a desired size and inserts the same into the open end of sleeve 32 so as to present the open end of the carton in proximity with the whip or cutting blades 39. Downward movement of the carton is limited by the inwardly extending blades and the conventional bottom cardboard surface of the carton lies in the same plane as the unobstructed upper end of sleeve 32.

The sleeve and its encased carton are then attached to the power disk 21 by passing lugs 35 through the disk apertures 37 and thence rotating the lugs so that they will lie transverse to the length of said apertures. At this point the packing machine is completely assembled, and by depression of trigger 42 the remote motor is energized so that the core 16 of the power cable will commerce to rotate at high speed, transferring its rotary motion to blades 39 through the intermediate power disk 21.

This type of packing machine is easily operated and it takes but a short time for the operator to become accustomed to the "feel" of the device when the carton has become completely packed with ice cream. Of course it will be understood that various types of electrical or mechanical pressure responsive devices may be applied between the lower surface of disk 21 and the carton 38 so that when the extracted body of ice cream has completely filled the carton, the electrical circuit which energizes the driving motor may be broken to automatically cease rotation of the device.

From the foregoing description of the present invention it will be seen that the present invention has produced a packing machine which is first of all thoroughly simple in construction and unusually light in weight, which permits its use continuously without fatigue even to women workers.

The packaging machine is further characterized by an open construction which is essential to meet rigid requirements governing sanitation of food handling operations. In this respect the open shells 32 may be lodged in containers of clear water when the individual shells are not in use. This will clean the apparatus of all particles of ice cream and since there are no crevices or corners present in its construction, the apparatus will not accumulate minute deposits of the ice cream.

While I have shown and described a preferred form of my invention, it will be understood that variations in details of form may be made without departure from the invention as defined in the appended claims.

What is claimed is:

1. An ice cream packaging device comprising a handle, a hollow hub portion at one end of said handle, a flexible cable entering one end of said hub, said cable having a sheath terminating within the hub and secured thereto, and an inner shaft extending beyond said sheath, a plate removably secured to the end of said shaft, a sleeve removably attached at one end to said plate and having a plurality of blades which are inclined in cross-section and curved convexly along their length outwardly from the other end of said sleeve, and means for causing rotation of said shaft.

2. An ice cream packaging device comprising a pistol grip handle having a depending hub at one end thereof, said hub having a passage therethrough adapted at its upper end to slidably receive the sheath of a flexible drive cable, said cable having a rotatable inner shaft extending beyond said sheath, a disk having a recess in the upper surface thereof for receiving the end of said shaft, means for removably attaching said disk to the shaft end, a sleeve open at one end and having a plurality of blades which are inclined in cross-section and curved convexly along their lengths outwardly from the other end thereof connected thereto, means for removably attaching the sleeve to said disk, means for causing rotation of said shaft, and means on said handle controlling the operation of said rotation causing means.

3. An ice cream packaging device comprising a pistol grip handle having a depending hub at one end thereof, said hub having a passage therethrough adapted at its upper end to slidably receive the sheath of a flexible drive cable, said cable having a rotatable inner shaft extending beyond said sheath, a disk like plate having a recess in the upper surface thereof for receiving the end of said shaft, means for removably securing said plate to the shaft end, a sleeve open at one end and having a plurality of blades inclined in cross section and curved outwardly from the other end of the sleeve to form a hemispherical pattern extending convexly outward from said other end, means for removably attaching the sleeve to said disk, means for causing rotation of said shaft, electrical wires between said rotation causing means and the pistol-grip handle, and a trigger means on said handle for breaking the circuit through said wires.

4. An ice cream packaging device comprising a pistol-grip handle having a depending hub at one end thereof, said hub having a passage therethrough adapted at its upper end to slidably receive the sheath of a flexible drive cable, said cable having a rotatable inner shaft extending beyond said sheath, the lower portion of said passage surrounding the shaft being of greater diameter than said upper end, an anti-friction bearing between the shaft and the wall of said passage, a nut surrounding the end of said shaft and secured within said lower portion of the passage below said bearing means, a sealing ring between said nut and shaft, a disk secured to the end of said shaft, a sleeve removably attached at one end to said disk and having a plurality of inclined arcuate blades at the other end thereof and means for causing rotation of said shaft.

5. An ice cream packaging device comprising a pistol-grip handle having a depending hub at one end thereof, said hub having a passage therethrough adapted at its upper end to slidably receive the sheath of a flexible drive cable, said cable having a rotatable inner shaft extending beyond said sheath, the lower portion of said passage surrounding the shaft being of greater diameter than said upper end, an anti-friction bearing between the shaft and the wall of said passage, a nut surrounding the end of said shaft and secured within said lower portion of the passage below said bearing means, a sealing ring between said nut and shaft, a disk having a recess in the upper surface thereof for receiving the end of said shaft, a sleeve open at one end and having a plurality of inclined blades disposed in a semi-spherical pattern at the other end of the sleeve, means for removably attaching the sleeve to said disk, means for causing rotation of said shaft, and means on said handle controlling the operation of said rotation causing means.

6. An ice cream packaging device comprising a pistol grip handle having a depending hub at one end thereof, said hub having a passage therethrough adapted at its upper end to slidably receive the sheath of a flexible drive cable, said cable having a rotatable inner shaft extending beyond said sheath, a disk-like plate having a recess in the upper surface thereof for receiving the end of said shaft, means for removably securing said plate to the shaft end, a sleeve open at one end and having a plurality of blades inclined in cross-section and curved outwardly from the other end of the sleeve to form a hemispherical pattern convexly outward from said other end, each blade having its outer end substantially flush with the wall of said sleeve and progressively twisting downwardly from said sleeve wall to the axis of the sleeve, means for removably attaching the open end of the sleeve to said disk, means for causing rotation of said shaft, electrical wires between said rotation causing means and the pistol-grip handle, and a trigger means on said handle for breaking the circuit through said wires.

NAOMI T. BLICK,
*Administratrix of the Estate of Walter H. Allison, Deceased.*

REFERENCES CITED

The following references are of record in the file of this patent:

UNITED STATES PATENTS

| Number | Name | Date |
|---|---|---|
| 1,372,863 | Collins | Mar. 29, 1921 |
| 1,477,760 | Kline | Dec. 18, 1923 |
| 1,534,099 | Balzak | Apr. 21, 1925 |
| 1,551,911 | Rovinsky et al. | Sept. 1, 1925 |
| 1,786,259 | Knapp | June 24, 1930 |
| 2,109,598 | Stasinski et al. | Mar. 1, 1938 |
| 2,132,088 | Torbert et al. | Oct. 4, 1938 |
| 2,262,706 | Benda | Nov. 11, 1941 |
| 2,504,075 | Karle | Apr. 11, 1950 |